United States Patent [19]
Fleissner

[11] 3,748,747
[45] July 31, 1973

[54] PROCESS AND APPARATUS FOR THE TREATMENT OF MATERIAL LENGTHS

[75] Inventor: Heinz Fleissner, Egelsbach near Frankfurt am Main, Germany

[73] Assignee: Vepa AG, Basel, Switzerland

[22] Filed: Apr. 30, 1970

[21] Appl. No.: 43,632

Related U.S. Application Data

[60] Division of Ser. No. 799,478, Feb. 14, 1969, Pat. No. 3,605,280, which is a continuation-in-part of Ser. No. 654,728, July 20, 1967, Pat. No. 3,503,134.

[52] U.S. Cl.................. 34/122, 34/115, 34/158, 26/60 R
[51] Int. Cl............................................. F26b 11/02
[58] Field of Search.................... 34/23, 115, 122, 34/12, 60, 158; 26/60

[56] References Cited
UNITED STATES PATENTS

| | | | |
|---|---|---|---|
| 3,440,736 | 4/1969 | Fleissner et al. | 34/158 X |
| 3,521,378 | 7/1970 | Fleissner | 34/158 X |
| 3,551,970 | 1/1971 | Cohn et al. | 34/158 |
| 3,021,607 | 2/1962 | Fleissner | 34/115 |

Primary Examiner—Carroll B. Dority, Jr.
Attorney—Craig, Antonelli & Hill

[57] ABSTRACT

The present disclosure is directed to a process and apparatus for the treatment of materials which comprises a heat-insulated treatment chamber, a plurality of sieve drum means subjected to a suction draft rotatably disposed within said treatment chamber, fan means for producing a suction draft and for circulating the treatment medium in said treatment chamber, heating means provided in the circulation zone of the treatment medium, tentering means containing tensioning chains at least partially disposed outside of the treatment chamber as inlet means, said tentering means cooperating with the sieve drum means for the effective conveyance of the material being treated to said sieve drum means, and outlet means for removing the material being treated from the treatment chamber.

3 Claims, 18 Drawing Figures

Inventor:
HEINZ FLEISSNER

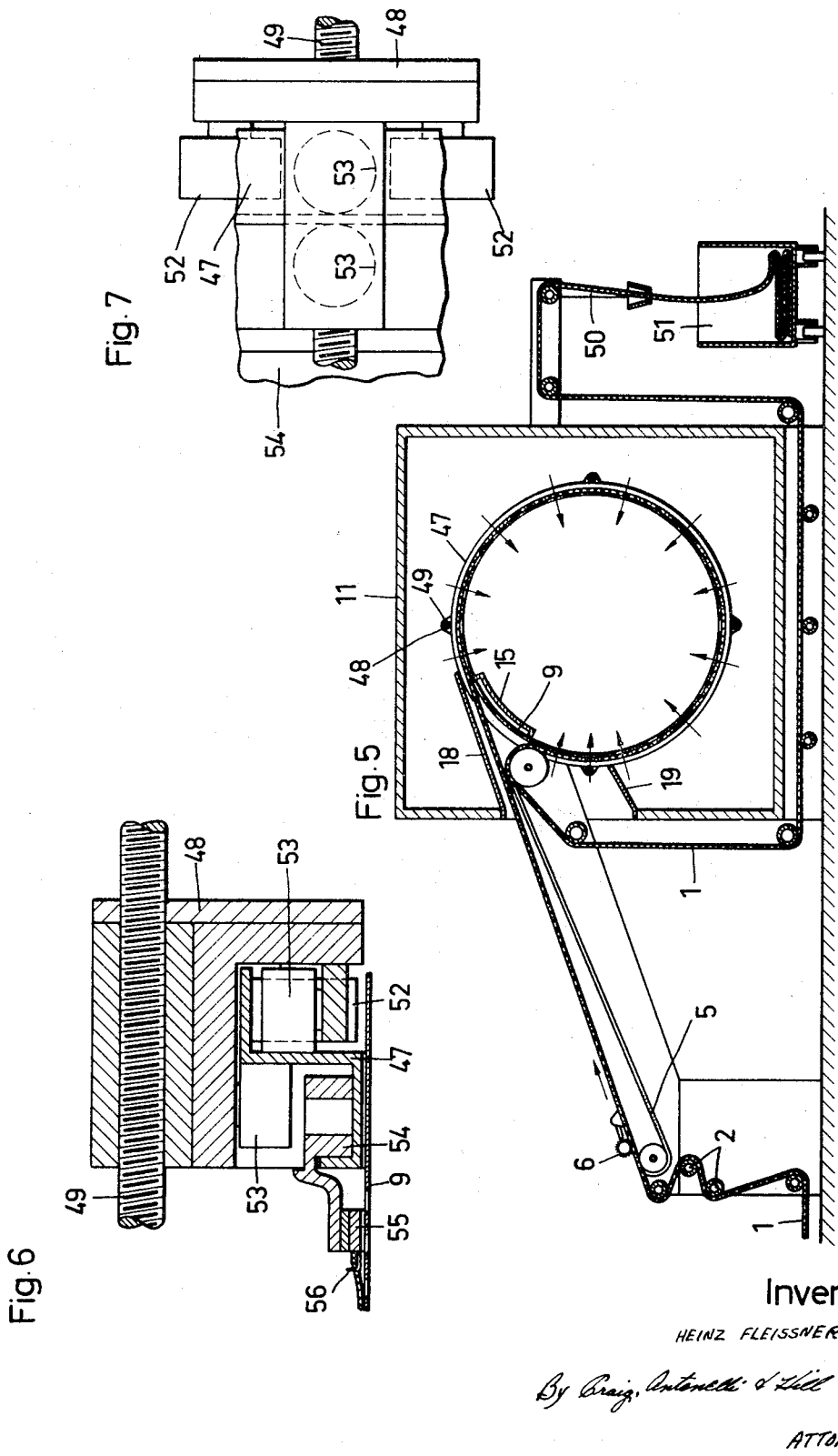

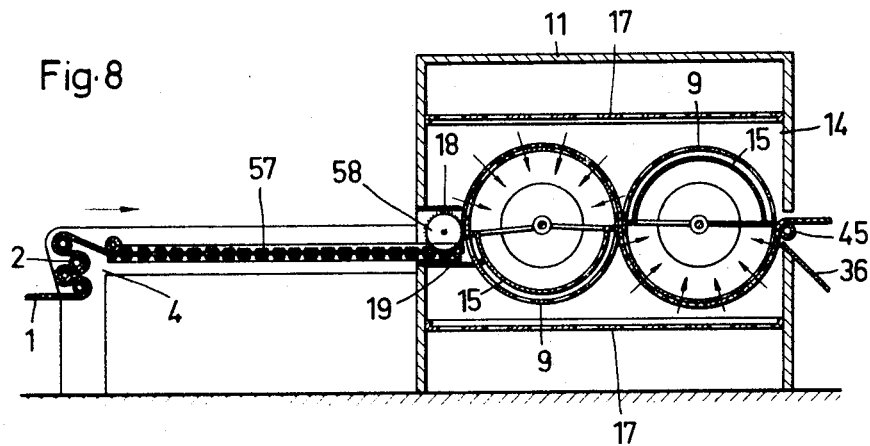
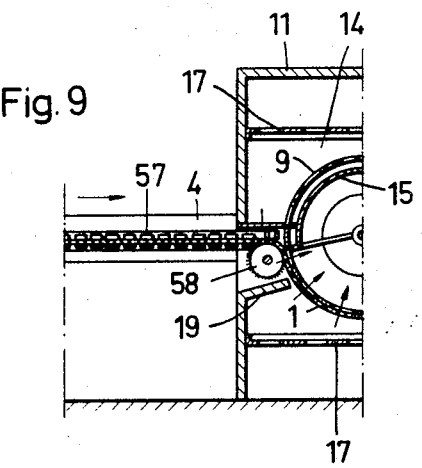
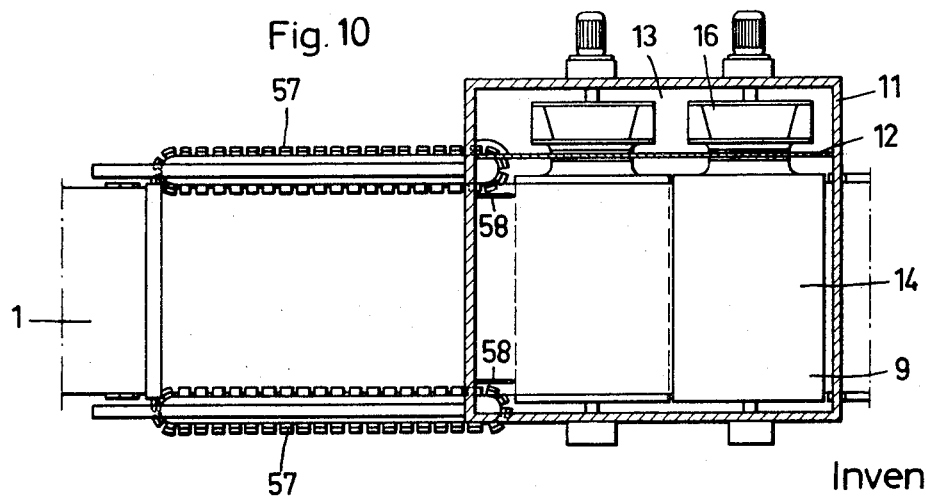

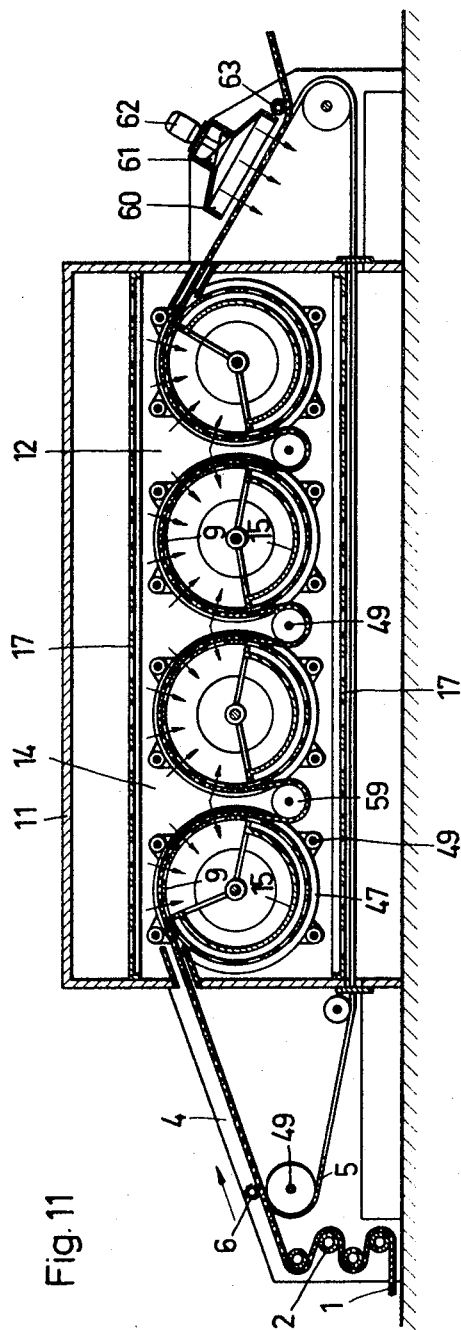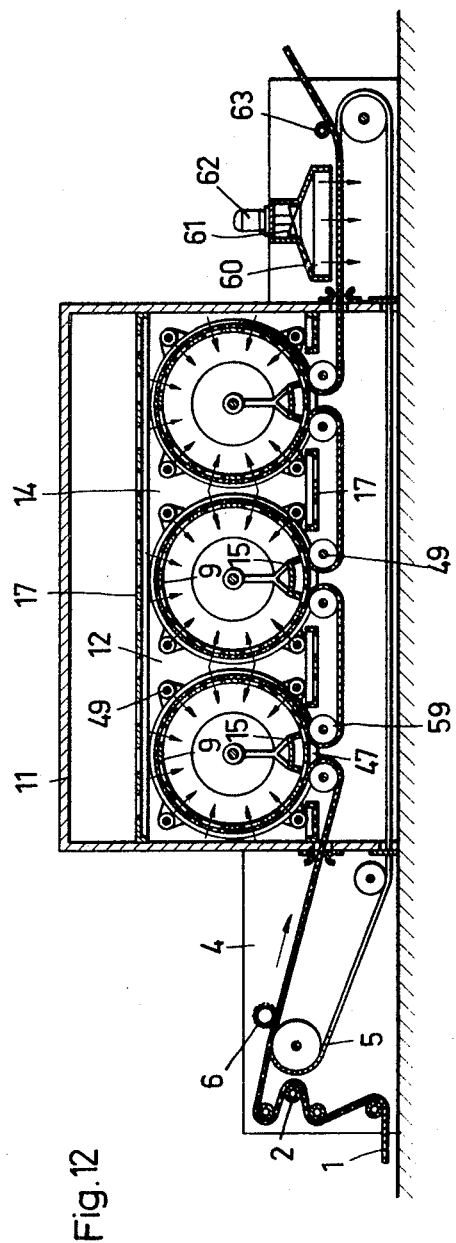

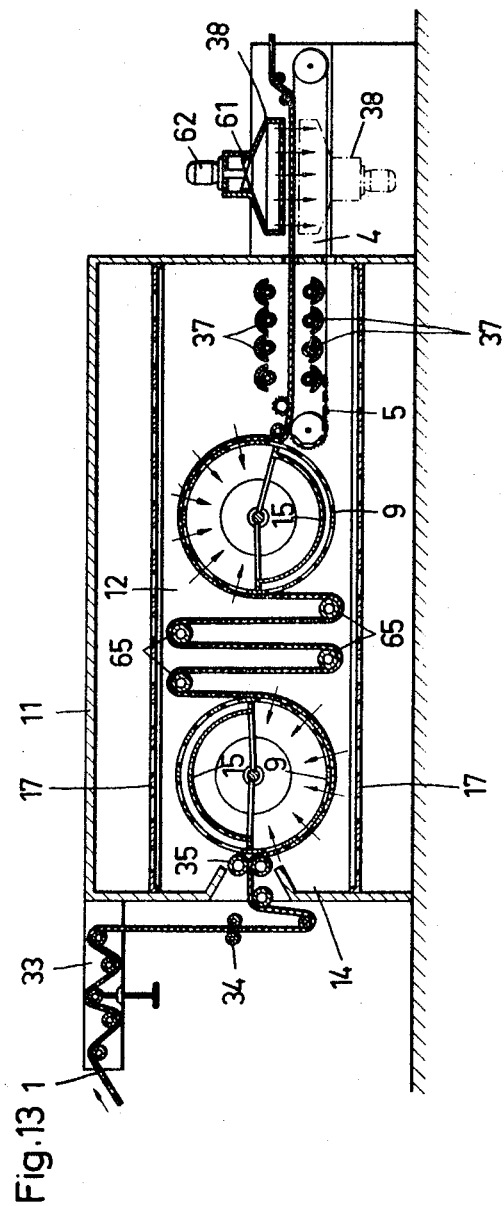

3,748,747

Inventor:

HEINZ FLEISSNER

By. Craig, Antonelli & Hill

ATTORNEYS:

Inventor:
HEINZ FLEISSNER

By Craig, Antonelli & Hill
ATTORNEYS

PROCESS AND APPARATUS FOR THE TREATMENT OF MATERIAL LENGTHS

This is a division of application Ser. No. 799,478, filed Feb. 14, 1969, and now U.S. Pat. No. 3,605,280 and which patent is a Continuation-in-Part of application of Ser. No. 654,728 filed July 20, 1967 and which is now U.S. Pat. No. 3,503,134.

BACKGROUND OF THE INVENTION

The present invention relates to apparatus for the treatment of material lengths, especially textile material lengths, such as woven and knitted fabrics, nonwovens, tufteds, etc., with a treatment medium, for example steam, air or steam-air mixtures. The apparatus of the present invention comprises a heat-insulated housing containing as the conveying element at least one sieve means subjected to a suction draft, preferably a sieve drum, one or several fans for producing a suction draft and for circulating the treatment medium and a heating unit. A tentering section with tension chains are arranged at least partially outside of the housing as an inlet and feeding unit in such a way that the material is guided in a width-tentered condition until it is fed and/or passed to the sieve means subjected to a suction draft.

It has been suggested to combine a tentering section with a device in which sieve means subjected to a suction draft, preferably sieve drums, are used as conveying elements. Thus use of the flow-through principle and the material guidance on sieve means during the treatment process offers substantial advantages when compared with a treatment on a tenter frame only. Advantages of using the flow-through principle on sieve means are the extremely short treatment times and a very uniform treatment effect. Furthermore, the material guidance on sieve means during the treatment results in a more uniform appearance of the goods, especially if fixation processes and knit goods are involved. By using a tentering section the material can be pre-tentered to a certain width, creases caused by centrifuging can be removed and a good shrinkage of the material can be ensured if the material is, for example, steamed on the tentering section.

SUMMARY OF THE INVENTION

An object of the present invention is to avoid the prior art disadvantages in the treatment of materials, for example, textile materials.

Another object of the present invention is to provide an improved apparatus for the treatment of textile materials which is very economical and substantially maintenance free.

A further object of the present invention is to provide an improved apparatus for the treatment of textile materials wherein a predetermined final width of the material being treated can be ensured.

A still further object of the present invention is to provide an improved process and apparatus for the treatment of textile materials wherein the material being treated is held and guided while it is being conveyed on the surface of the sieve drum means at least until the material has been heated up to the fixation temperature.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the abovementioned disadvantages may be eliminated and a much improved process and apparatus for the treatment of materials, for example, textile materials may be obtained by holding the material on tensioning chains and, at the same time, on the conveying means, for example sieve drum means subjected to a suction draft and by drawing the treatment medium through the material being treated at least until said material has been heated up to the fixation temperature. This process can, for example, be carried out on an apparatus in which the tensioning chains of the tentering means are passed at least around the first sieve drum subjected to a suction draft. It is advantageous if the sieve drum which is embraced by the tensioning chains is arranged above the subsequent sieve drum. For this purpose, it is desirable to use the well known sieve drum dryer with staggered sieve drums. In this case, the first sieve drum should be situated in the upper row and should be embraced by the tensioning chains.

However, it is also possible to provide a common tentering means (section) and to correlate this tentering section to the sieve drum of the upper row, that is, the textile length is passed from the tentering section to the first sieve drum of the upper row. Furthermore, it is possible to arrange the sieve drums in one vertical row. In this case, it is advantageous if the tentering section is preferably correlated to the drum at the bottom or to the drum at the top of the row. Furthermore, it is advantageous to arrange tentering section tangential to the sieve drum at the bottom of the row or to the sieve drum at the top of the row. With such an arrangement, it is expedient to have the two ends of the tentering section extend out of the heat-insulated housing. The bearings of the deflector wheels for the tensioning chains are thus located outside the hot treatment atmosphere. With such an arrangement, the wear is substantially reduced and the maintenance is considerably facilitated.

If the tentering section is correlated to the sieve drum at the top of the row, it can be advantageously arranged near the point of material passage from one drum to the next drum, so that the top sieve drum is substantially embraced by the material being processed. In order to avoid material shrinkage, it is expedient to provide, for this arrangement, a pinning-out and transfer member between the tentering section and the sieve drum, for example a suction roller or disk which may be fitted with spikes. Also, if the tentering section is arranged beneath the sieve drum at the bottom of the row, a more favorable contact of the material being treated with this sieve drum may be achieved if a sieve roller is provided as a pinning-out and transfer member between the tentering section and the sieve drum. This sieve roller may be subjected to a suction draft or to a positive pressure.

With an apparatus in which the tensioning chains are passed around the first sieve drum, the material length may be lifted out of the pins of the tensioning chains by the suction draft of the subsequent sieve drum. To render this possible, it is suggested to pass the material from the sieve drum which is embraced by the tensioning chains to the subsequent sieve drum at approximately the closest point of approach of these two drums.

In order to avoid wear of the tensioning chains and a tightening of the tensioning chains which are passed around the drums, it is furthermore suggested to guide the tensioning chains in the zone around the sieve drums in rings which are pivotably mounted. The rings may be mounted so that they can be axially adjusted by means of threaded spindles, and so that the setting of the respective desired working width is readily effected. It is advantageous if the guides of the tensioning chains in the rings have U-shaped cross sections, with the open side of the U pointing outwards. For the rings proper, roller bearings are desired, said roller bearings being arranged on mounting supports on the threaded spindles. For axial guidance and for taking up axial tension load, it is suggested to correlate to each mounting support at least one additional roller bearing, preferably an additional pair of roller bearings.

It is expressly pointed out that the present invention cannot only be realized with vertical revolving tensioning chains, but that also a tentering section with horizontal chain returns can be used. In this case, it is only necessary to arrange between the tentering section and the subsequent sieve drum a pinning-out and transfer member, for example disks or rings which may possibly be provided with holding elements and/or pins. It is also possible to use a tentering section with clip chains and/or a combined tentering section which can be optionally fitted with pins or with clips.

It is also advantageous to arrange the tensioning chains below or above the sieve drums and to pass the material lengths to the adjacent sieve drum preferably at the lowest respectively, the highest point of the sieve drum, possibly with the help of a pinning-out and transfer member.

Since the material is drawn out of the pins at the first sieve drum and heated up to the treatment temperature, the material tends to shrink on that sieve drum, particularly in fixation processes. In order to ensure a good material passage and a minimum shrinkage, it is suggested to provide a fan means at least at the first sieve drum, said fan means providing a means for setting suction drafts of varying power, for example by varying the speed of the fan wheel. In this way, the suction draft can be adapted to the particular material to be processed.

However, in some cases it is more advantageous to hold the material on tensioning chains during the whole treatment process. In order to permit the use of the flow through principle and sieve drums in these cases, it is suggested to design the tensioning chains in such a way that they can be moved to all sides, at least within certain limits, and, if several sieve drums are used, to pass the tensioning chains around the sieve drums in such a way that only one side of the material rests on the sieve drums during the treatment. It is thus possible to process pile goods, for example tufted carpets, on such sieve drums without damaging or pressing the pile.

Above all, with the latter device, it is advantageous if the tensioning chains are passed out of the heat-insulated housing at the inlet and at the discharge end of the apparatus. The pinning-up and pinning-out areas are thus easily accessible and also the bearings for the deflecting elements of the tensioning chains are not exposed to the hot treatment atmosphere.

Especially for devices which are intended for materials which develope high shrinkage forces during the treatment process, it is advantageous, if the tensioniong chains are guided during the passage from one sieve drum to the next sieve drum and if the guides are mounted in such a way that they can be adjusted in the direction of the drum axis. With such a device it is also possible to pass the tensioning chains almost completely around the sieve drums and to provide at each sieve drum a guide disk, a guide wheel or the like, for each tensioning chain at the point of passage between two sieve drums.

Especially for fixation processes, it is advantageous if the material is chilled while still held by the tensioning chains. For this purpose, it is suggested to arrange a cooling device outside the heat-insulated housing at the discharge end above and/or below the material which is held between the tensioning chains. The chain return may be effected outside the heat-insulated housing or beneath a sheet which is provided in the treatment chamber of the housing.

For high material speeds and, above all, for treatment processes such as for the thermosol dyeing process and for curing processes which require an extended dwelling time under the respective treatment temperatures, it is suggested to use a device which is provided in the housing on the inlet side with at least one sieve drum which is penetrated by the treatment medium, followed by a material accumulator which advantageously consists of two rows of rollers. The material accumulator may also be followed by at least one additional sieve drum means as well as a tentering section at the discharge end of the apparatus. In such a device the material can be heated to the respective and required treatment temperature in a shock-like manner and uniformly over the working width and can then dwell in the material accumulator. By means of the subsequent sieve drum, possible temperature differences occurring in the material accumulator can be corrected. Subsequently, and especially in fixation processes, the textile material can be tentered in the tentering section to the respective required width. In many cases it is advantageous to correlate to the sieve drum at the inlet end of the treatment chamber, to the material accumulator and if a sieve drum is provided at the discharge end, also to said sieve drum, a temperature control which operates independent of the others so that the treatment temperatures can be reduced by degrees. In this way, a slightly higher temperature can be established for the sieve drum at the inlet end than for the material accumulator in order to reduce the heating-up period. At high operating speeds, the textile material is then not heated up to the pre-set temperature of the treatment medium on the sieve drum but only to the temperature which prevails in the material accumulator.

As already mentioned, it is desirable if the material is cooled down after fixation processes. In a device in which the tentering section is arranged at the discharge end of the apparatus, it is suggested to arrange a cooling roller above the tentering section in order to achieve a shock-like cooling down of the material. This roller may serve simultaneously as a pinning-out roller.

Especially in the case of large working widths of, for example, about 3 to 5 meters, and if materials are handled which are susceptible to tensile stress, it is desirable to associate with the tentering section at least one revolving endless supporting element. The supporting element may consist of cords or ribbons which are arranged at a distance from each other and which, as seen in the direction of material passage, may be guided at an obtuse angle to each other, preferably at the material-supporting side. However, it is also possible to correlate a wide supporting belt to the tensioning chains. The width of the supporting belt should be larger than the maximum tensioning width.

For a device in which the tensioning chains are passed around at least one sieve drum, it is desirable to design the supporting belt as a wire-mesh belt and to pass the supporting belt also around the sieve drum. However, for a device in which a tentering section precedes the first sieve drum and in which the tensioning chains are not passed around the sieve drum, it may be advantageous if the supporting element is at least partially passed around at least one sieve drum. By such an arrangement of the supporting element, an effective passage of the material to the sieve drum is always ensured. Since with such an arrangement the material is held and guided between the drum and the supporting element, the supporting element helps to prevent material shrinkage during the heating-up process.

Furthermore, it is desirable if the supporting element is subjected to a suction draft in the area in which the material is pinned out, for example by correlating a sieve roller subjected to a suction draft to the supporting element in that area. By the suction draft the material is lifted out of the pins and, at the same time, it is prevented from shrinking until it is passed to the subsequent drum. Also, it is advantageous to design the supporting element in such a way that it can be temporarily driven at a higher or a slower speed than the tensioning chains. This is possible, for example, by the use of an overriding clutch. By the higher or slower speed of the supporting element as compared with the tensioning chains, weft distortions or diagonal distortions in the material can be compensated for.

The arrange of a belt-type supporting element offers another advantage, that is, if this belt is arranged and designed accordingly, it may serve as a feeding unit for tubular, ribbon or hank-type materials as well as for flock and for several lengths of fabric. However, if such a design of the supporting element is difficult to connect with the apparatus, it is also possible to correlate another material feeding unit to one sieve drum subjected to a suction draft, preferably to the sieve drum which takes over the material length from the tentering section. This material feeding unit is then arranged at another level than the tensioning chains, preferably at a higher or a lower level. This second material feeding unit may be provided with at least one roller or conveyor belt. It is of advantage if the conveyor belt of the second material feeding unit is arranged in such a way that it can be swivelled and if the swivelling axis is provided preferably at the treatment chamber. With such a design, the conveyor belt may be swivelled upwards or downwards so that it does not hamper the operation of the tentering section.

It is also possible to arrange a platform above the tentering section and to set up the material feeding unit and/or auxiliary devices such as a hopper feeder, padder or the like on this platform. If a second material feeding unit is utilized, it is advantageous to correlate to the sieve drums subjected to a suction draft a baffle which optionally interrupts the suction draft in the zone between the first and the second material inlet or which subject this zone to a suction draft. It is this possible to subject this area of the sieve drum to the suction draft if material is passed over this area or to interrupt the suction draft if this area of the sieve drum is not covered with the material. This optional baffling of this area of the sieve drum may for example be achieved by mounting the baffle which is provided for this purpose in the sieve drum in such a way that it can be rotated. Alternately, two perforated or slotted baffle sheets may be provided, at least one of which is mounted so that it can be displaced or rotated with respect to the other sheet. Thus the perforations of the two sheets can be opened or covered.

BRIEF DESCRIPTION OF THE DRAWINGS

The present invention will become more fully understood from the detailed description given hereinbelow and the accompanying drawings which are given by way of illustration only and thus are not limitative of the present invention and wherein.

FIG. 5 shows another embodiment of the present invention in longitudinal sections;

FIG. 6 is a cross section of the mounting support and the guide means of one tensioning chain around the sieve drum of the apparatus according to FIG. 5;

FIG. 7 is a plan view of the mounting support shown in FIGS. 5 and 6 in which the guide ring of the tensioning chain is supported;

FIG. 8 shows a longitudinal section of another embodiment of the apparatus of the present invention wherein horizontal pin returns are utilized;

FIG. 9 shows the point of passage from the tentering section to the sieve drum in an apparatus similar to that shown in FIG. 8;

FIG. 10 is a plan view of the apparatus according to FIG. 8 clearly showing the horizontal pin return in the tentering section;

FIG. 11 is a longitudinal section of the apparatus of the present invention in which the tensioning chains are passed around several sieve drums;

FIG. 12 is a longitudinal section of the apparatus of the present invention, similar to that of FIG. 11;

FIG. 13 is a longitudinal section of the apparatus of the present invention wherein the tentering section is provided at the discharge end of the treatment chamber;

DESCRIPTION OF THE PREFERRED EMBODIMENTS

Figure 1:
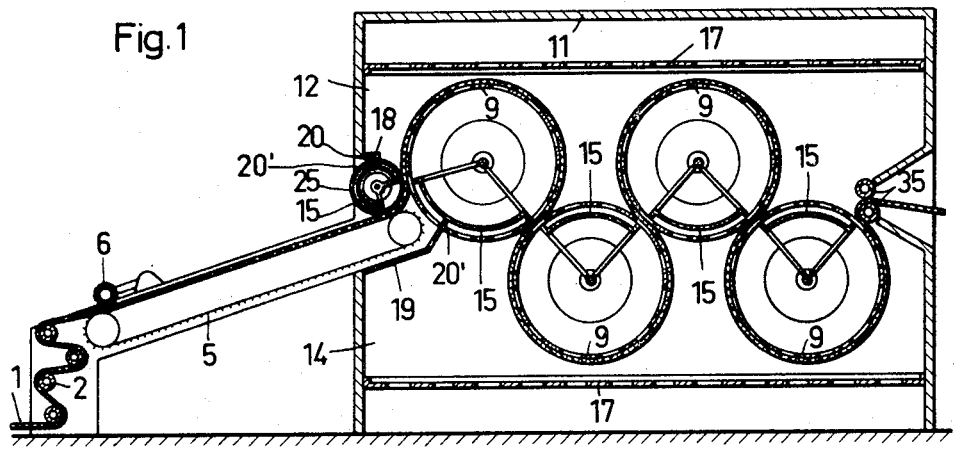
FIG. 1 shows the apparatus of the present invention wherein staggered sieve drums are utilized.

Referring now to the drawings, wherein like reference numerals are used throughout the various views to designate like parts, the apparatus of the present invention according to FIG. 1 shows material lengths 1 being passed over rollers 2 while being spread at the same time. The material is then taken over by pin chains 5 in the sameway as with a common tenter frame. In the apparatus according to FIG. 1, pin chains with a vertical pin return are shown. However, it is also possible to use chains with horizontal chain returns. Also, clip chains can be used. The material 1 is pinned up by means of lateral brush rolls 6.

The apparatus of the present invention comprises a heat-insulated housing 11 which is subdivided by means of a lengthwise partition 12 into a treatment chamber 14 and into a fan chamber 13, in the same way as the standard sieve drum dryers. In the treatment chamber, sieve drums 9 subjected to a suction draft are arranged. In the fan chamber 13 a fan (not shown) is correlated to the side of each sieve drum, said fan drawing the treatment medium out of the sieve drum and returning it into the treatment chamber at the top and at the bottom of said chamber. Above and below the sieve drums 9 sieve sheets 17 are provided for equalizing the treatment medium flow. At the inlet of the housing 11 a suction roller 25 is provided as a pinning-out element. At the outside, this suction roller 25 is sealed against the housing by means of a seal 20. In the suction roller 25 at the side which is not covered with the material being treated, a baffle 15 is arranged which interrupts the suction draft at this side of the suction roller. Similar baffles 15 are also provided in the sieve drums 9. The baffle 15 in the suction roller 25 is provided with seals at the two ends as well as with a seal 20'. This seal 20' is directly correlated to an outer baffle 18. A similar seal 20' is also provided in the first sieve drum 9 opposite to the outer baffle 19. By using baffle 19, the hot treatment medium is prevented from coming into contact with the pin chains and the deflect wheels of the pin chains. It is of advantage if the baffles 18' and 19 are also heat-insulated, so that heat losses are avoided.

The discharge end of the apparatus is sealed by means of a pair of rollers 35. Instead of a pair of rollers however, also a slide or a conveyor belt may be utilized.

Figure 2:
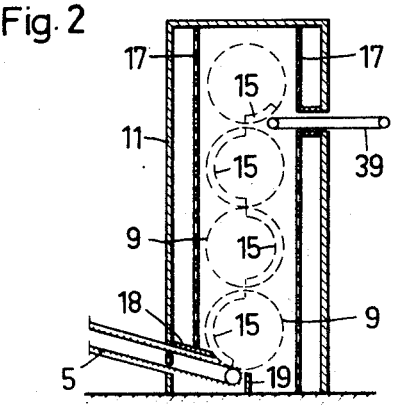
FIG. 2 discloses the apparatus of the present invention wherein the sieve drums are arranged in one vertical row.
Figure 3:
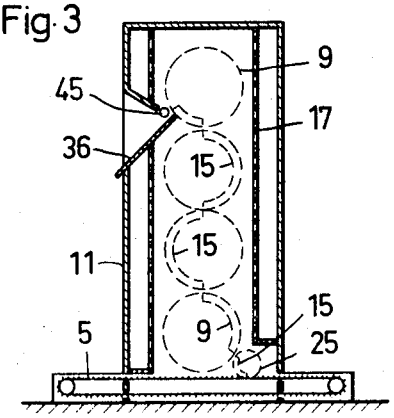
FIG. 3 shows an embodiment of the present invention similar to that of FIG. 2 with a different arrangement of the tentering means.

The apparatus according to FIGS. 2 and 3 are of similar design as the apparatus according to FIG. 1, but in these devices the sieve drums 9 are arranged in one vertical row. In the apparatus according to FIG. 2 the pin chains 5 extend directly to the bottom sieve drum 9, so that the material 1 is lifted out of the pin chains 5 by the suction draft of the bottom sieve drum 9. As a discharge element a conveyor belt 39 is correlated to the top sieve drum 9.

In the apparatus according to FIG. 3 the pin chains extend out of the housing 11 at both sides so that the bearing and deflector units for the pin chains are not exposed to the heat. As in the device according to FIG. 1, a suction roller 25 is provided in this device which lifts the material 1 out of the pins and passes it to the first sieve drum 9. Since, in this embodiment of the present invention, the suction roller is located in the hot treatment medium atmosphere, the material is already heated almost to the treatment temperature by the suction draft of the suction roller 25. However, it is also possible to arrange the suction roller outside the hot treatment atmosphere. At the discharge end of this device a slide 36 is arranged to which a roller 45 is correlated.

Figure 4:
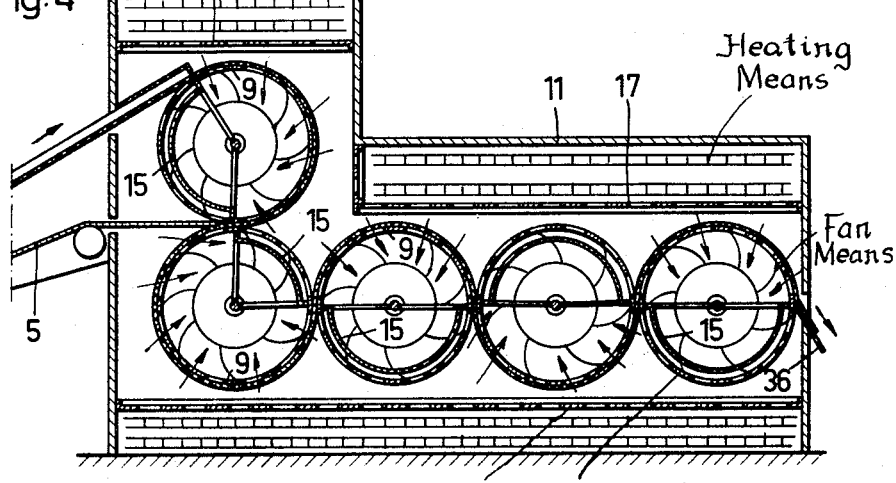
FIG. 4 shows the apparatus of the present invention wherein the tensioning chains of the tentering means are passed around the first sieve drum.

In the apparatus according to FIG. 4, pin chains 5 are passed around the first sieve drum 9. This offers the advantage that the material 1 is held by the tensioning chains during the heating-up period and/or during the treatment on the first sieve drum 9, so that material shrinkage is substantially avoided. The sieve drum 9 which is embraced by the tensioning chain is situated above the other sieve drums which are arranged in one horizontal row. Using this arrangement a relatively large wrap of the first and the second sieve drum is obtained. This large wrap renders it possible to dry a textile material to a certain residual moisture content of for example about 10% on the first sieve drum and to heat it to the fixation temperature on said first sieve drum. The same applies to curing and thermosoling processes. In this device the material need not be stretched in width beyond the desired final width. Since the material is held by the pin chains during the heating-up and thus the shrinking stage. The shrinkage forces of the fiber which has been heated up to the fixation temperature are not great enough to overcome the force of the suction draft of the sieve drum which holds the material being treated.

The apparatus according to FIGS. 5 to 7 is of similar design as the aforementioned devices. The pin chains 5 are guided around the sieve drum 9 in rings 47 which are pivotably mounted and which can be adjusted axially by mounting supports 48 using threaded spindles 49. In this embodiment of the present invention the material inlet and the material discharge for the material length 1 are provided on the same side of the conveying means so that the sieve drum 9 may be substantially embraced by the material being treated. Upon leaving the housing 11 the material length 1 is pinned out and passed beneath the treatment chamber to a plating device 50 which folds the material length 1 into a container 51.

At one or both faces of the sieve drum a blower (not shown) is correlated which draws the treatment medium out of the sieve drum and thus produces a negative pressure in the sieve drum 9, said negative pressure causing a uniform and intensive penetration of the treatment medium through the material length within the range of the sieve drum. Each mounting support 48 which is adjustably mounted on a threaded spindle 49 is provided with two rollers bearings 52 which support the rings 47. For the axial guidance, two further rolls 53 are provided in each mounting support 48 which engage the vertical portion of the ring 47. Chain links 54 are special links and, according to the present invention, designed in such a way that pin bars 55 with hooked pins 56 are situated at the same level as the sieve drum jacket.

In the apparatus according to FIGS. 8 to 10, a tentering section 4 with clip chains 57 is provided with a horizontal clip chain return which is arranged in front of the treatment chamber or housing 11. The inlet 12 of the tentering section is designed similar to that of the corresponding tenter frames. In order to prevent the material from shrinking in its width when the clip chains are opened and before it is taken over by the subsequent sieve drum 9, a disk 58 which is fitted with pins is correlated above the material to each clip chain 57, said disk holding the material 1 during passage from the clip chain 57 to the sieve drum 9. Of course, pin chains with horizontal chain returns can also be used instead of clip chains. In order to prevent loss of the hot treatment medium, heat-insulated baffles 18 and 19 are arranged at the inlet and extend from the housing 11 near the sieve drum 9.

FIG. 9 shows in detail the point of passage between the tenting section 4 and the sieve drum 9. In this embodiment of the present invention the disks 58 are arranged beneath the material 1.

In the apparatus according to FIGS. 11 and 12, the pin chains 5 are passed around several sieve drums 9. Also, here the pin chains 5 are guided around the sieve drum 9 in pivotably mounted rings 47. The rings 47 are supported on threaded spindles 49 and are adjustable.

In the apparatus according to FIG. 11, pivotably mounted disks 59 are provided on the threaded spindles 49 for guiding the pin chains 5 between the sieve drums 9.1 The material 1 leaves the housing 11 and is subsequently cooled down by means of a cooling unit 60 while still being held in the pin chains 5. In this embodiment of the present invention the cooling unit consists of a jet box with an axial fan 61 and a fan motor 62. The material is is then pulled from the pins by means of a roller 63.

The apparatus according to FIG. 12 is of similar design as that of FIG. 11. The same elements are therefore marked with the same numerals. However, in this device two disks 59 are correlated to the sieve drum 9, over which disks the pin chains are guided so that the sieve drum 9 is more completely embraced by the material 1. In this embodiment of the present invention, the baffles 15 may be dispensed with.

In the apparatus according to FIG. 13, the material 1 is passed over and inlet creel 33 and the material guide 34 to a pair of rollers 35. This pair of rollers 35 renders it possible to overfeed the material 1 onto a sieve drum 9 which is arranged in the treatment chamber 14 directly at the inlet. The sieve drum 9 as well as the rollers 65 are accommodated in a common heat-insulated housing 11. On the second sieve drum 9 behind the rollers 65 as seen in the direction of material passage, the material 1 is again held by the suction draft and heated to a constant temperature. From the sieve drum 9 the material 1 is passed in a tensionless state to a tentering section 4 which partially extends into the housing 11. Infrared radiators 37 are associated with the tentering section, said radiators being arranged above and below the material 1. Instead of infrared radiators, jet boxes may also be provided. Outside the housing 11 and above the material being treated, a jet box 38 is provided wherein cold air is blown against the material 1 for cooling down said material. As shown by the dash dash-dot line, another jet box 38 may be provided below the material 1. Axial fans 61 with motors 62 are provided in the jet boxes 38. Instead of these jet boxes 38, a cooling roller may also be associated with the tentering section 4 for cooling down the material. The cooling roller may be arranged above the tensioning chains and serve simultaneously as a pinning-out roller. Subsequently, the material may be batched or plated.

Figure 14:
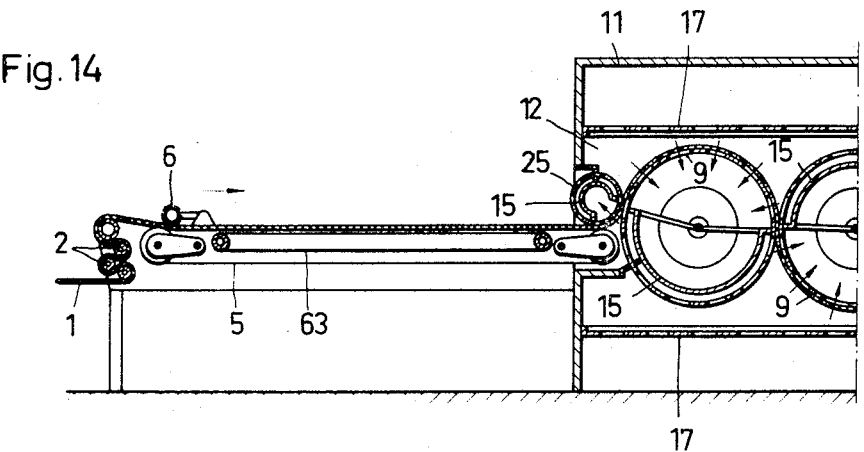
FIGS. 14, 15 and 16 are longitudinal sections of several embodiments of the apparatus of the present invention using a supporting belt.
Figure 15:
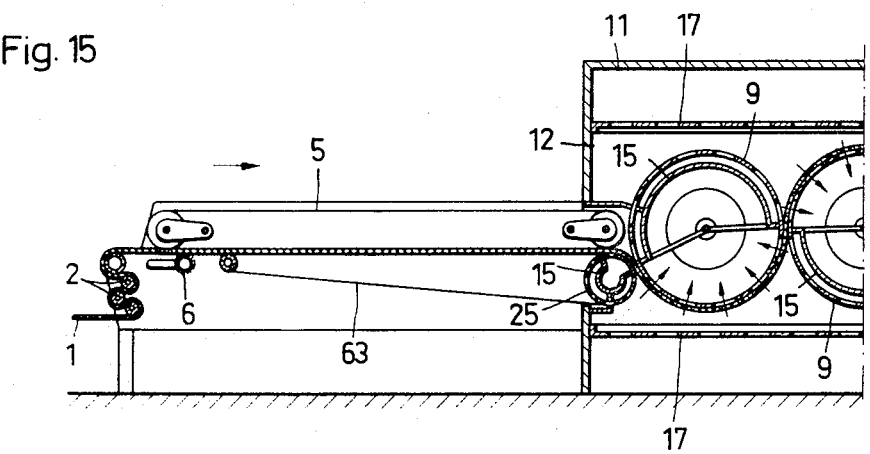
Figure 16:
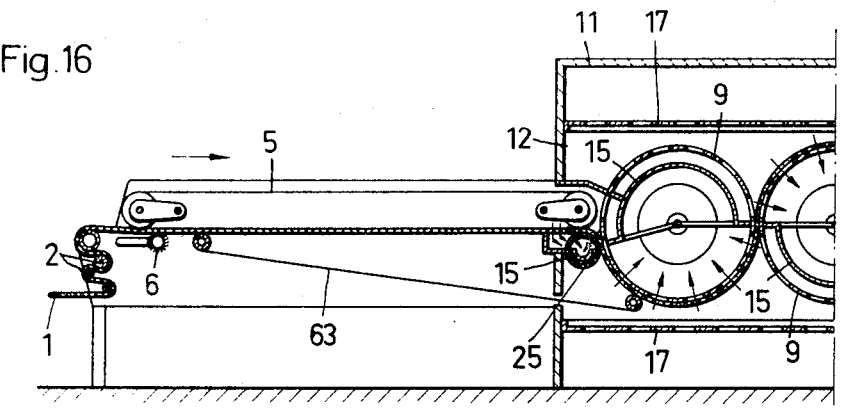

FIGS. 14, 15 and 16 are longitudinal sections of several embodiments using sieve drum devices with an inlet tentering section. In the apparatus according to FIG. 14, a suction roller 25 is arranged at the inlet of the housing 11 for passing the material 1 from the pin chains 5 to the first sieve drum 9. Between the tensioning chains a conveyor belt 63 is arranged as a supporting element. Also, in the apparatus according to FIGS. 15 and 16, a conveyor belt 63 is correlated to the tentering section. However, with this tentering section the material 1 is guided at the bottom side of the pin chains 5. In these embodiments of the invention the conveyor belt 63 extends beyond the maximum tentering width. In the apparatus according to FIG. 15 a suction roller 25 is again correlated to the first sieve drum 9 for lifting the material 1 out of the pin chains 5 and for simultaneously deflecting the material 1. Also, with this suction roller 25 the suction draft is interrupted by a baffle 15 at that portion of said roller which is not covered with the material being treated. In the apparatus according to FIG. 16 the conveyor belt 63 is passed around part of the first sieve drum 9, so that the material 1 is held between the conveyor belt 63 and the sieve drum 9 during the heating-up process. The embodiments of the present invention according to FIGS. 15 and 16 offer the further advantage that several tubes of materials or hank-type materials and even loose-fibrous stock can be fed to and processed on the sieve drums.

Figure 17:
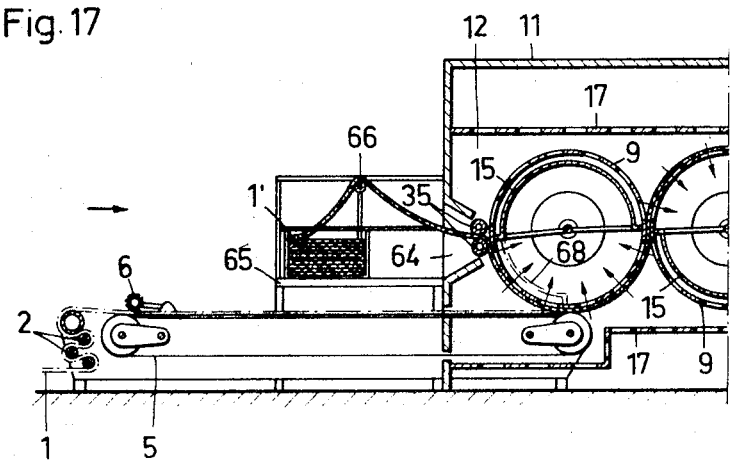
FIGS. 17 and 18 show two embodiments of the present invention wherein a second material feeding unit is utilized.
Figure 18:
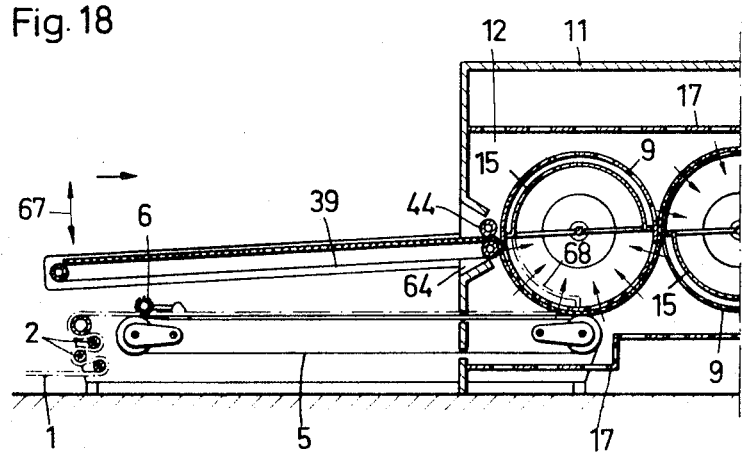

The apparatus according to FIGS. 17 and 18 are of similar design as the previously described devices. However, these two embodiments are equipped with a second material feeding unit 64. This material feeding unit according to the apparatus of FIG. 17 comprises a pair of rollers 35. With this device tubular material 1' is fed from a pile on a platform 65. The tubular material 1' is drawn off the pile over a roller 66.

In the apparatus according to FIG. 18 the second material feeding unit 64 is provided with a conveyor belt 39 which, as shown by an arrow 67, can be swivelled upwards. A roller 44 is correlated to the conveyor belt 39 at the housing 11 for sealing purposes. Tubular material as well as hank-type material and loose-fibrous stock can be fed to the first sieve drum 9 on this conveyor belt 39. The range between the point of material passage from the pin chains 5 and the second material feeding unit 64 can, at option, be subjected to a suction draft or the suction draft may be interrupted by means of a baffle 68 which can be rotated.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. An apparatus for the treatment of textile material which comprises a heat-insulated treatment chamber, at least one sieve drum means subjected to a suction draft rotatably disposed within said treatment chamber, fan means for producing a suction draft and for circulating the treatment medium in said treatment chamber, heating means provided in a circulation zone of the treatment chamber and tentering means at least partially disposed outside of the treatment chamber for introducing textile material into said treatment chamber and onto a conveying surface of said sieve drum means, said tentering means including tensioning chains which embrace at least a portion of the conveying surface of the sieve drum means, means for guiding said tensioning chains around the portion of the conveying surface of said sieve drum means, said means for guiding said tensioning chains including ring means mounted on mounting supports which are threadably connected to threaded spindles, said mounting supports being movable on said threaded spindles to effect axial adjustment of said ring means, roller bearings radially supporting said ring means and allowing rotation of said ring means on said mounting supports and each mounting support having at least one roller bearing to provide axial guidance of said ring means and for absorbing the axially effective forces acting on said ring means, and outlet means for removing the textile material from the treatment chamber.

2. The apparatus of claim 1, wherein the ring means includes guides for said tensioning chains, said guides and having U-shaped cross sections with the open side of the U pointing outwards.

3. The apparatus of claim 1, wherein one sieve drum means is utilized and wherein the tensioning chain embraces substantially the entire working surface of the sieve drum means.

* * * * *